(12) United States Patent
Randel

(10) Patent No.: US 7,061,488 B2
(45) Date of Patent: Jun. 13, 2006

(54) LIGHTING AND SHADOWING METHODS AND ARRANGEMENTS FOR USE IN COMPUTER GRAPHIC SIMULATIONS

(75) Inventor: Mark R. Randel, Flower Mound, TX (US)

(73) Assignee: Terminal Reality, Inc., Lewisville, TX (US)

( * ) Notice: Subject to any disclaimer, the term of this patent is extended or adjusted under 35 U.S.C. 154(b) by 597 days.

(21) Appl. No.: 10/010,776

(22) Filed: Dec. 6, 2001

(65) Prior Publication Data

US 2002/0067355 A1 Jun. 6, 2002

Related U.S. Application Data

(63) Continuation of application No. 09/268,078, filed on Mar. 12, 1999, now Pat. No. 6,362,822.

(51) Int. Cl.
*G60T 17/00* (2006.01)

(52) U.S. Cl. .................................................. 345/426
(58) Field of Classification Search ............ 345/418, 345/419, 425, 426, 427
See application file for complete search history.

(56) References Cited

U.S. PATENT DOCUMENTS 5,704,024 A * 12/1997 Voorhies et al. ............ 345/426
6,018,350 A * 1/2000 Lee et al. .................... 345/422
6,097,394 A * 8/2000 Levoy et al. ................ 345/419
6,195,099 B1 * 2/2001 Gardiner ...................... 345/426
6,203,431 B1 * 3/2001 Miyamoto et al. .......... 345/419
6,362,822 B1 * 3/2002 Randel ........................ 345/426

* cited by examiner

*Primary Examiner*—Matthew C. Bella
(74) *Attorney, Agent, or Firm*—Morgan, Lewis & Bockius, LLP (57) ABSTRACT

The effects of lighting and resulting shadows within a computer simulated three-dimensional scene are modeled by rendering a light depth image and a light color image for each of the light sources. The light depth images are compared to a camera depth image to determine if a point within the scene is lighted by the various light sources. An accumulated light image is produced by combining those portions of the light color images determined to be lighting the scene. The resulting accumulated light image is then combined with a camera color image to produce a lighted camera image that can be further processed and eventually displayed on a computer display screen. The light color image can be static or dynamic. Transformations between different perspective and/or coordinate systems can be pre-calculated for fixed cameras or light sources. The various images and manipulations can include individual pixel data values, multiple-pixel values, polygon values, texture maps, and the like.

62 Claims, 6 Drawing Sheets

LIGHTING AND SHADOWING METHODS AND ARRANGEMENTS FOR USE IN COMPUTER GRAPHIC SIMULATIONS

This application is a continuation of application Ser. No. 09/268,078, filed on Mar. 12, 1999, now U.S. Pat. No. 6,362,822.

TECHNICAL FIELD OF THE INVENTION

The present invention relates to computer graphics and, more particularly, to improved methods and arrangements f or use in rendering lighting and shadows in computer graphic simulations, such as, for example, interactive computer graphics simulations of multi-dimensional objects.

BACKGROUND

Computer generated graphics are becoming more popular in everyday computing especially given recent advances in affordable computer hardware and software. This trend is expected to continue in the foreseeable future. By way of example, interactive computer generated graphical images are becoming increasingly detailed and more realistic due to increased processing capabilities in personal computers (PCs). No where is this more evident than in the computer gaming arena, wherein virtual three-dimensional (3D) worlds are created in software and interactively explored by the computer's user.

As with the real World, these virtual 3D worlds consist of a plurality of 3D objects. These 3D objects are typically modeled by one or more polygons. In the computer, depending upon the orientation of the scene being viewed, some of these polygons correspond to individual pixels that are displayed on the computer's display screen. Within the computer, these pixels are represented by data that can be manipulated and stored in at least one data base. For example, once the arrangement of these 3D objects with respect to one another has been determined for a particular viewpoint, the rendered scene of the 3D world is projected onto a two-dimensional (2D) frame that can be displayed to the user. The frame is typically a data base that contains pixel color information with regard to the display screen.

A sense of motion within this virtual 3D world is provided by incrementally altering the arrangement of these 3D objects and quickly re-displaying the transformed frame. Typically, a frame rate of at least about twenty-five (25) frames-per-second (fps) is desired to convey a sense of motion.

Rendering such interactive 3D worlds, however, typically requires that millions of calculations be conducted between frames (i.e., in "real time"). Since there is a limit to the amount of processing that a computer can provide between frames, simplifications or other compromises often need to be made in modeling a 3D world. Additionally, advanced algorithms are implemented in either hardware and/or software to further streamline the processing of the resulting 3D scene and 2D images. Regardless of how the rendering computations are completed, the goal remains the same, namely, to provide a realistic, interactive virtual 3D world to the user.

One of the unfortunate compromises made in the past, has been in the area of lighting and, more particularly, in the area of rendering shadows cast by lighted 3D objects. Many shadow rendering processes have been considered to be too compute intensive for most lower-end computer applications, and as such shadow rendering is often ignored or otherwise greatly simplified. Several advanced and simplified shadow rendering algorithms and other graphical algorithms and techniques are described by James D. Foley, et al. in *Computer Graphics: Principles and Practice*, second edition, 1997 (ISBN 0-201-84840-6), published by Addison-Wesley Publishing Company, Inc. This text is expressly incorporated herein, by reference, in its entirety and for all purposes.

By way of a particular example, Foley et al. describe a promising two-pass object-precision shadow algorithm in Section 16.4.2 of the text. This two-pass shadow algorithm, developed by Atherton, Weiler and Greenberg, essentially determines which portions on a 3D object's surfaces are visible from the perspective of a light source (i.e., from the light source's view point). This requires converting the data for the 3D object, as represented in a data base, from a modeled world coordinate to a light source coordinate and then determining which portions of the various polygons are visible surfaces with respect to the light source, for example, using a hidden-surface removal algorithm. Since these visible portions are illuminated (i.e., lit) by the light source, the remaining portions (i.e., the hidden-surfaces) are darkened as being shaded from the light. The resulting data is then transformed back to modeling world coordinates and merged with the original object data base. This creates a viewpoint-independent merged data base that can be used to determine the shadows on the various 3D objects from any other viewpoint. This is the first step of the two-step shadow algorithm.

In the second step of the two-pass shadow algorithm, the data in the merged data base is then converted from the modeled world space to a corresponding screen (or camera) viewpoint. Then, a hidden-surface algorithm is used to determine which portions of the various polygons are visible surfaces with respect to the camera. These visible portions are identified as being visible to the camera and as being either not-darkened (i.e., lit) or darkened (i.e., in a shadow). A polygon scan-conversion algorithm is then used to render the resulting 2D image.

One of the drawbacks to this type of shadow algorithm is that unrealistic shadowing can occur in scenes having multiple light sources. Foley et al. for example, one page 747 of their text, teach that multiple light sources are handled by re-processing the merged data base for each new light source. Thus, for example, assume that a portion of a polygon which is visible from the camera viewpoint has been darkened because it is shaded from a first light source. This is information is recorded in the merged data base. Then, this merged data base is used as the starting point for a similar process for the second light source's viewpoint determination. As part of this second light source's viewpoint determination, additional darkening can occur to portions of the scene that are also shaded from the second light source. As a result, there is a potential for a portion of the scene to be darkened twice. In scenes having multiple light sources, including ambient light, this additive darkening of portions, and in particular, pixels, tends to reduce the realism of the shadowing effects and can lead to awkward shadowing cross-talk, wherein a shadow is made overly dark and has unrealistic transitions. This is especially true for applications using a "stencil buffer" technique for shadowing.

Additionally, when there are several light sources, for example, four or more, the transformation process associated with converting between the camera, world, and light viewpoints in support of this type of two pass algorithm can prove to be too burdensome, thereby inhibiting or otherwise diminishing the effectiveness of the resulting interactive real-time graphics.

Consequently, there is need for improved shadow rendering methods and arrangements. Preferably, the improved shadow rendering methods and arrangements support real time interactive graphics on conventional PCs and the like, and allow for multiple light sources to be modeled in a more efficient and realistic manner.

SUMMARY OF THE INVENTION

In accordance with certain aspects of the present invention, improved lighting and shadow rendering methods and arrangements are provided. These improved lighting and shadow rendering methods and arrangements can be implemented to support real time interactive graphics on conventional computers such as personal computers (PCs), computer gaming devices and the like. These improved methods and arrangements allow for multiple light sources to be modeled in a more efficient and realistic manner without becoming overly burdensome, or otherwise inhibiting or diminishing the effectiveness of the resulting interactive real time graphics.

For example, the above stated needs and others are met by a shadow rendering method for use in a computer system, in accordance with certain embodiments of the present invention. The method includes the steps of providing observer data of a simulated multi-dimensional scene and providing lighting data associated with a plurality of simulated light sources arranged to illuminate the scene. This lighting data includes light image data, for example. For each of the light sources, the method then includes the steps of comparing at least a portion of the observer data with at least a portion of the lighting data to determine if a modeled point within the scene is illuminated by the light source, and storing at least a portion of the light image data associated with the point and the light source in a light accumulation buffer. Once this is completed, the method includes the steps of combining at least a portion of the light accumulation buffer with the observer data, and displaying the resulting image data to a computer screen.

In accordance with certain further embodiments of the present invention, the observer data includes observed color data and observed depth data associated with a plurality of modeled polygons within the scene as rendered from an observer's perspective. Thus, for example, the modeled polygons can be associated with a single pixel on the computer screen or a group of pixels, wherein the observed color data includes an observed red-green-blue value for the pixel(s) and the observed depth data includes an observed z-buffer value for the pixel(s). Similar data is provided for the lighting data, wherein, in certain embodiments, the lighting data includes source color data associated with at least one of the light sources and source depth data associated with the plurality of modeled polygons within the scene as rendered from a plurality of different light source's perspectives.

In accordance with still further embodiments of the above method, at least a portion of the observed depth data is compared with at least a portion of the source depth data to determine if the modeled point is illuminated by the light source. This can include, for example, converting at least a portion of the observed depth data from the observer's perspective to at least one of the plurality of different light source's perspectives, before comparing the observed depth data with the source depth data. For fixed light sources and/or observer a precalculated matrix transformation look-up table can be used.

In accordance with other embodiments of the present invention, the above method can also be used to simulate dynamically changing light sources, interrupted light beams, reflected light beams, and/or projected light images, such as, for example, motion picture, video, animation, and computer graphics images. This can be accomplished, for example, by having at least a portion of the source color data being selectively controlled source color data, which can be changed over a period of time.

An arrangement that is configured to render shadows in a simulated multi-dimensional scene is also provided to meet the above stated needs and others, in accordance with certain further embodiments of the present invention. The arrangement includes a display screen configured to display image data, memory for storing data, such as, observer data, lighting data, light accumulation data, and frame data. At least one processor is coupled to the memory and the display screen and operatively configured to compare, for each of the plurality of light sources, observer data with lighting data to determine if a modeled point within the scene is illuminated by the light source and, if so, to store light image data in a light accumulation buffer, which can then be combined with observer data, and stored in the frame buffer for display via the display screen.

In accordance with still further embodiments of the present invention a method for simulating light falling on a modeled object in a computer generated multi-dimensional graphics simulation is provided. This method includes rendering a camera view of an object to produce a camera depth array and a corresponding camera image array, rendering at least one light view of the object to produce a light depth array and a corresponding light image array, and transforming camera depth data to the light view to produce a transformed camera array. The method further includes, for each data value therein, comparing the light depth array to the transformed camera array to determine if the data value in the light depth array is closer to the simulated light, and if so, adding a corresponding data value from the light image array to a light accumulation array, and then for each data value therein, multiplying the camera image array by a corresponding data value from the light accumulation array to produce a lighted camera image array.

The improved methods and arrangements of the present invention can be implemented in hardware and/or software. Thus, in accordance with certain embodiments of the present invention, a computer-readable medium is provided. A computer readable medium, by way of example, can include any tangible apparatus suitable for conveying or otherwise carrying at least one set of computer instructions. This can include a removable media associated with a computer system or a data communications link or network over which computer implemented instructions and/or data are carried, for example.

Thus, in accordance with certain embodiments of the present invention, such computer instructions are configured to cause a computer to operatively simulate light falling on a modeled object in a computer generated multi-dimensional graphics simulation by performing the following operations: 1) rendering an observer view; 2) rendering a source view; 3) transforming observed depth values to the source view; 4) modifying at least one image accumulation value with one of the observed image values if the corresponding transformed observer value is equal to a comparable one of the source depth values; 5) multiplying the one of the observed image values by the at least one image accumulation value to produce at least one pixel value; and 6) displaying the pixel value on a computer screen. In certain embodiments, following operation 4), operations 2) through 4) are repeated for each additional source.

In accordance with yet other embodiments of the present invention, there is provided a computer-readable medium carrying at least one set of computer instructions configured to cause at least one processor within a computer system to operatively render simulated shadows in a multi-dimensional simulated scene by performing the steps of providing observer data, providing lighting data, comparing observer data with lighting data to determine if a modeled point within the scene is illuminated by the light source, storing at least a portion of the light image data associated with the point and the light source in a light accumulation buffer, combining at least a portion of the light accumulation buffer with the observer data, and displaying resulting image data to a computer screen.

BRIEF DESCRIPTION OF THE DRAWINGS

A more complete understanding of the method and arrangements of the present invention may be had by reference to the following detailed description when taken in conjunction with the accompanying drawings wherein.

DETAILED DESCRIPTION OF THE DRAWINGS

Figure 1:
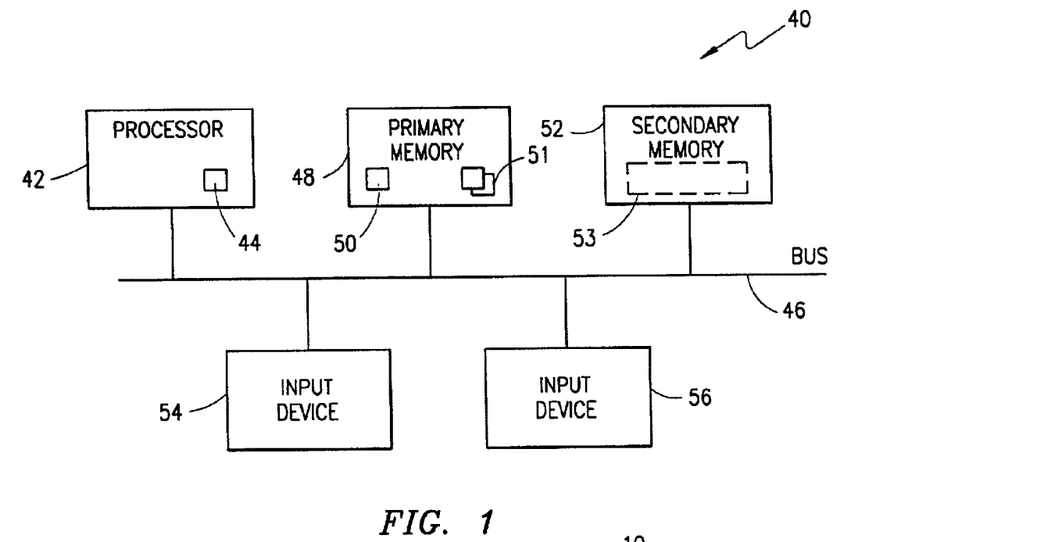
FIG. 1 is a block diagram depicting a computer system that is configured to generate and display interactive 3D graphics, in accordance with certain embodiments of the present invention.

FIG. 1 is a block diagram depicting a computer system or like device, 40, that is configured to generate and display interactive 3D graphics, in accordance with certain embodiments of the present invention. Computer system 40 includes at least one processor 42 that is configured to operate in accordance with at least one computer application 44 having computer instructions therein. Processor 42 can include at least one microprocessor or central processing unit (CPU), math co-processors, input/output processors, memory access processors, local memory cache, graphics accelerator processors, etc. A bus 46 is connected to processor 42 and configured to carry data and/or control signals thereto and therefrom. Bus 46 includes one or more buses, and can also include additional communication chip sets, interfaces, gateways, and/or networks.

A primary memory 48, including at least one frame buffer 50, is connected to bus 46 and configured to store data and to be accessed by at least processor 42 via bus 46. Primary memory 48 can also include a plurality of additional memory partitions, buffers, and/or data bases 51. Primary memory 48 typically includes random access memory (RAM) or the like. A secondary memory 52 is connected to bus 46 and configured to store data and to be accessed by at least processor 42 via bus 46. Secondary memory 52 can include additional memory and/or a data storage device, such as, for example, a hard disk drive, removable-disk drive, a CD-ROM drive, a DVD-ROM drive, a tape drive, a server, and/or the like. A removable computer-readable media 53 is shown for use with certain types of secondary memory 52. Media 53 can be, for example, an optical disc (e.g., CD, DVD, etc.), a magnetic disk, a data cartridge, a magnetic tape, or a similar medium configured to store data.

At least one user input device 54 is connected to bus 46 and configured to allow a user to input commands to processor 42 via bus 46. By way of example, input device 54 can include a keyboard, a mouse, a trackball, a game input, a joy stick, a pen and tablet, a pointing device, a touch screen, a voice recognition device, or other similar devices. At least one output device 56 is connected to bus 46 and configured to display or otherwise output data from processor 42 to the user. For example, output device 56 can include a CRT display, a flat panel display, a LCD display, a plasma display, a television, a projected display, a printer, an imager, etc.

Figure 2:
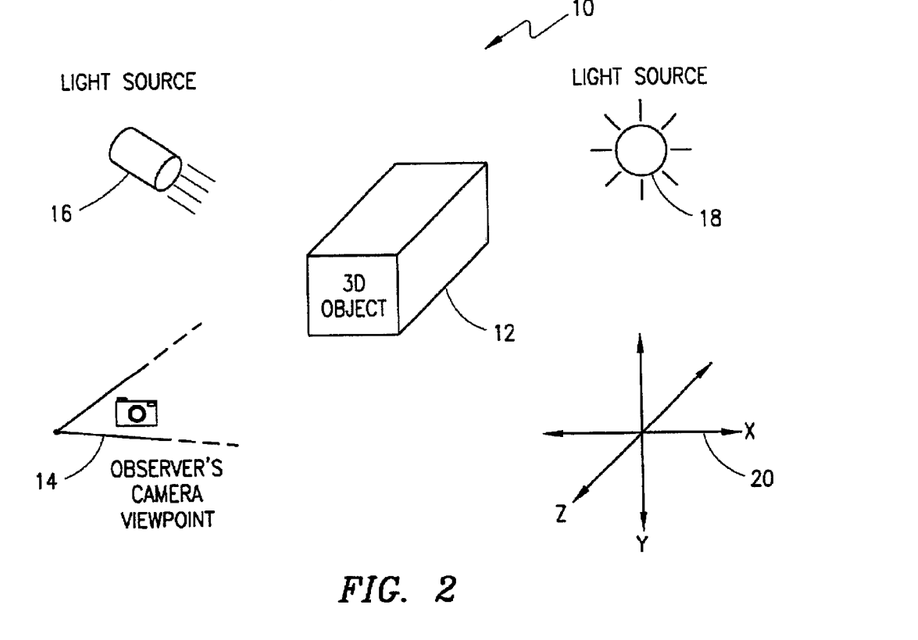
FIG. 2 is a block diagram depicting an exemplary 3D graphics scene that can be rendered by a computer system as in FIG. 1, in accordance with certain embodiments of the present invention.

FIG. 2 is a block diagram depicting an exemplary 3D graphics scene 10 that can be rendered by computer system 40 of FIG. 1. Scene 10 includes at least one 3D object 12 that is arranged within a defined space (e.g., background or backdrop). 3D object 12 is represented by spacial data, for example, a plurality of polygons. When viewed from camera perspective 14, certain portions of scene 10 will be visible within the field-of-view (fov) associated with the camera and the camera's position and orientation with respect to scene 10. Camera 14 is typically modeled as being responsive to visible light from scene 10. As such, scene 10 is illuminated, for example, by one or more light sources, such as, a first light source 16 (#1) and a second light source 18 (#2). Light source #1, in this example, is a uni-directional light source having a particular position, orientation and constrained field-of-view. Light source #2 is, in this example, a multi-directional light source having a particular position, orientation and non-constrained field-of-view. Light sources #1 and #2 are modeled as emitting one or more frequencies of visible light, at an initial intensity (color), onto scene 10.

A world space coordinate system 20, for example, having an arbitrary origin and x, y, and z coordinates extending therefrom, is employed to define the spacial relationship between 3D object 10, light sources 16 and 18, and camera 14. Known matrix algebra techniques are used to convert or transform between world space coordinate system 20 and the unique coordinates from the perspectives of light source 16, light source 18, and camera 14. Such techniques are described, for example, in the text by Foley et al.

Figure 3:
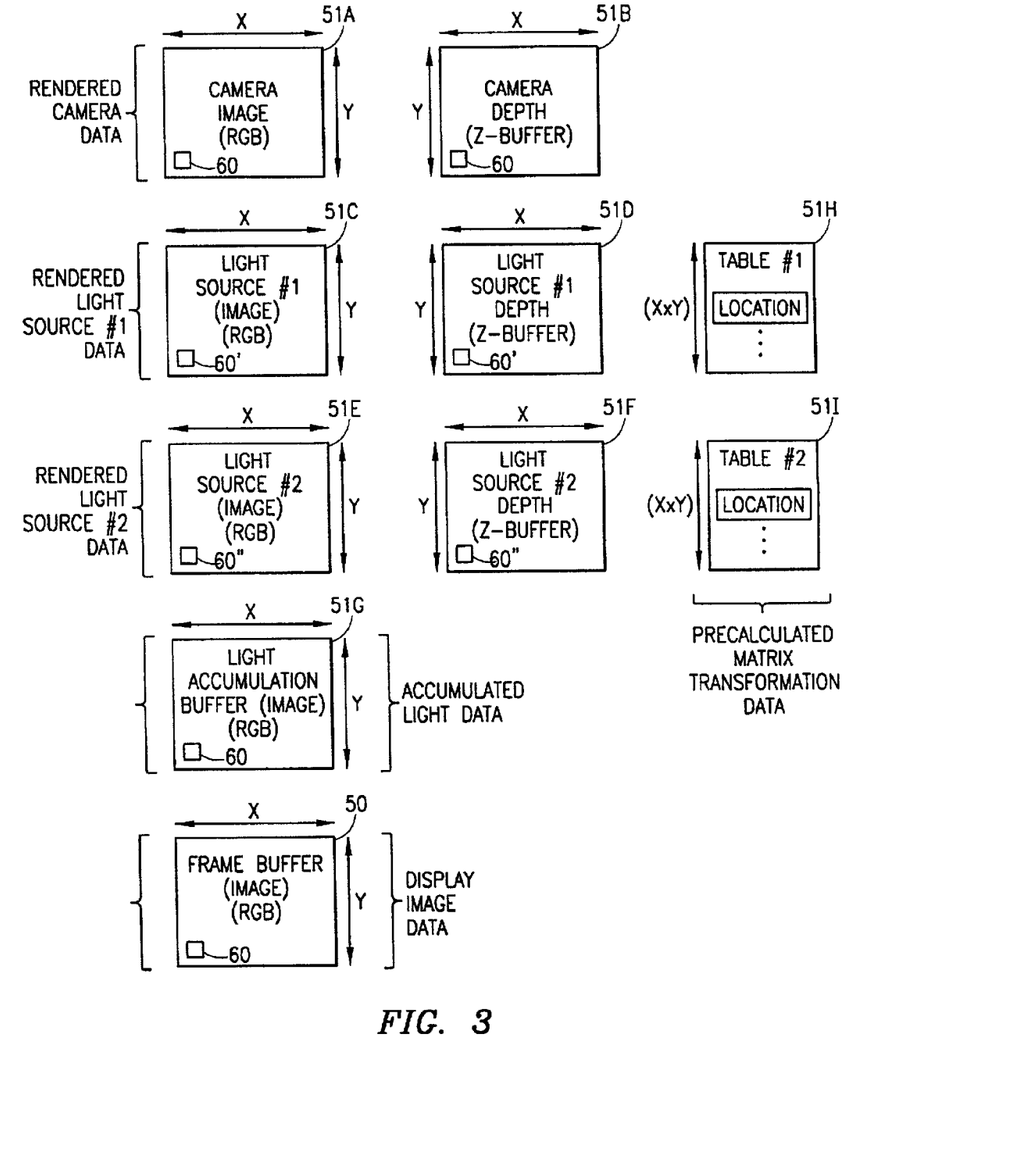
FIG. 3 is a block diagram depicting exemplary arrangements of modeling data as used to render shadows, for example, using the computer system in FIG. 1, in accordance with certain embodiments of the present invention.

With this in mind, FIG. 3 is a block diagram depicting exemplary arrangements of modeling data as used to render lighting and shadows, in accordance with certain embodiments of the present invention. For convenience, the various rendered data in FIG. 3 is illustrated as being logically stored in a plurality of 2D matrices or data bases 50 and 51A–G, each having an X axis and a Y axis. Preferably, and in this example, the X and Y axis correspond an exemplary output device 56 having a screen that displays X by Y number of pixels when provided corresponding red-green-blue (RGB) pixel data values. Those skilled in the art will recognize that other conventions and/or arrangements can also be used for storing and manipulating the data.

For camera 14, a camera image 51A is rendered of scene 10. Camera image 51A includes RGB pixel data values from scene 10 for X by Y number of pixels (or pixel groups). An exemplary pixel 60 having camera coordinates $SP_x$ and $SP_y$ is depicted. Associated with camera image 51A is camera depth 51B. Camera depth 51B is a Z-buffer containing depth information for each of the X by Y number of pixels in camera image 51A. The depth image is used during rendering to correctly determine the ordering of 3D objects within scene 10, from the camera's perspective. The use of Z-buffers is well known, for example, see Foley et al.

For light source #1, a light image 51C is rendered of scene 10. Light image 51C includes RGB pixel data values for the light emitted, for X by Y number of pixels. For example, the data in light image 51C can represent the intensity, color, and/or pattern of light emitted by light source #1. An exemplary pixel 60', which corresponds to pixel 60 in camera image 51A, is depicted following transformation as having light source #1 coordinates $L_1P_x$ and $L_1P_y$. Associated with light image 51C is light depth 51D. Light depth 51D is a Z-buffer containing depth information for each of the X by Y number of pixels (or groups of pixels) in light image 51C. The depth image is used during rendering to correctly determine the ordering of 3D objects within scene 10, from light source #1's perspective.

Similarly, for light source #2, a light image 51E is rendered of scene 10. Light image 51E includes RGB pixel data values for the light emitted, for X by Y number of pixels (or groups of pixels). For example, the data in light image 51E can represent the intensity, color, and/or pattern of light emitted by light source #2. An exemplary pixel 60", which corresponds to pixel 60 in camera image 51A, is depicted following transformation as having light source #2 coordinates $L_2P_x$ and $L_2P_y$. Associated with light image 51E is light depth 51F. Light depth 51F is a Z-buffer containing depth information for each of the X by Y number of pixels in light image 51E. The depth image is used during rendering to correctly determine the ordering of 3D objects within scene 10, from light source #2's perspective.

A light accumulation buffer 51G is also depicted as having pixel data values for X by Y number of pixels (or groups of pixels), as in camera image 51A and camera depth 51B. Light accumulation buffer 51G includes RGB pixel data for the accumulated light falling on a pixel (or groups of pixels) from light sources #1 and #2. As discussed below, by using light accumulation buffer 51G, a more realistic shadow rendering can occur, because pixels are accumulatively lighted, rather than accumulatively darkened as in past interactive real time shadow rendering algorithms.

Frame buffer 50 is also depicted as having pixel data values for X by Y number of pixels, as in camera image 51A, camera depth 51B, and light accumulation buffer 51G. Frame buffer 50 includes RGB data of the final rendered 2D image of scene 10. The data in frame buffer 50 is provided to output device 56 for display to the user. Those skilled in the art will recognize that a plurality of frame buffers can be employed to allow for additional buffering of frames.

A first transformation table (#1) 51H is also depicted in FIG. 3. Transformation table #1, is used, in accordance with certain embodiments of the invention to provide for rapid transformation of pixels between camera coordinates and light source #1 coordinates. Transformation table #1 includes X times Y number of entries (locations), preferably arranged to directly corresponding to the sequential memory addresses of the pixel data values in camera image 51A. When light source #1 and camera 14 each have fixed positions with respect to one another and/or scene 10, transformation table #1 can be precalculated and populated with data using known matrix algebra relationships between the world space coordinate system 20 and the light source #1 and camera 14 perspectives. Thus, the resulting transformation table #1 can be used to quickly determine which, if any, of pixels 60' (light image) correspond to a specific pixel 60 (camera image).

Similarly a second transformation table (#2) 51I is further depicted in FIG. 3. Transformation table #2, is used, in accordance with certain embodiments of the invention to provide for rapid transformation of pixels between camera coordinates and light source #2 coordinates. Transformation table #2 includes X times Y number of entries (locations), preferably arranged to directly corresponding to the sequential memory addresses of the pixel data values in camera image 51A. When light source #2 and camera 14 each have fixed positions, transformation table #2 can be precalculated and populated with data using known matrix algebra relationships between the world space coordinate system 20 and the light source #2 and camera 14 perspectives. Thus, the resulting transformation table #1 can be used to quickly determine which, if any, of pixels 60" (light image) correspond to a specific pixel 60 (camera image).

By using transformation tables 51H–I, and precalculating the data therein, a substantial amount of processing time is saved when compared to calculating the same data "on-the-fly". This additional cost savings can be especially critical for interactive 3D graphic applications designed to operate on slower, lower-end, and/or older computer systems.

Figure 4:
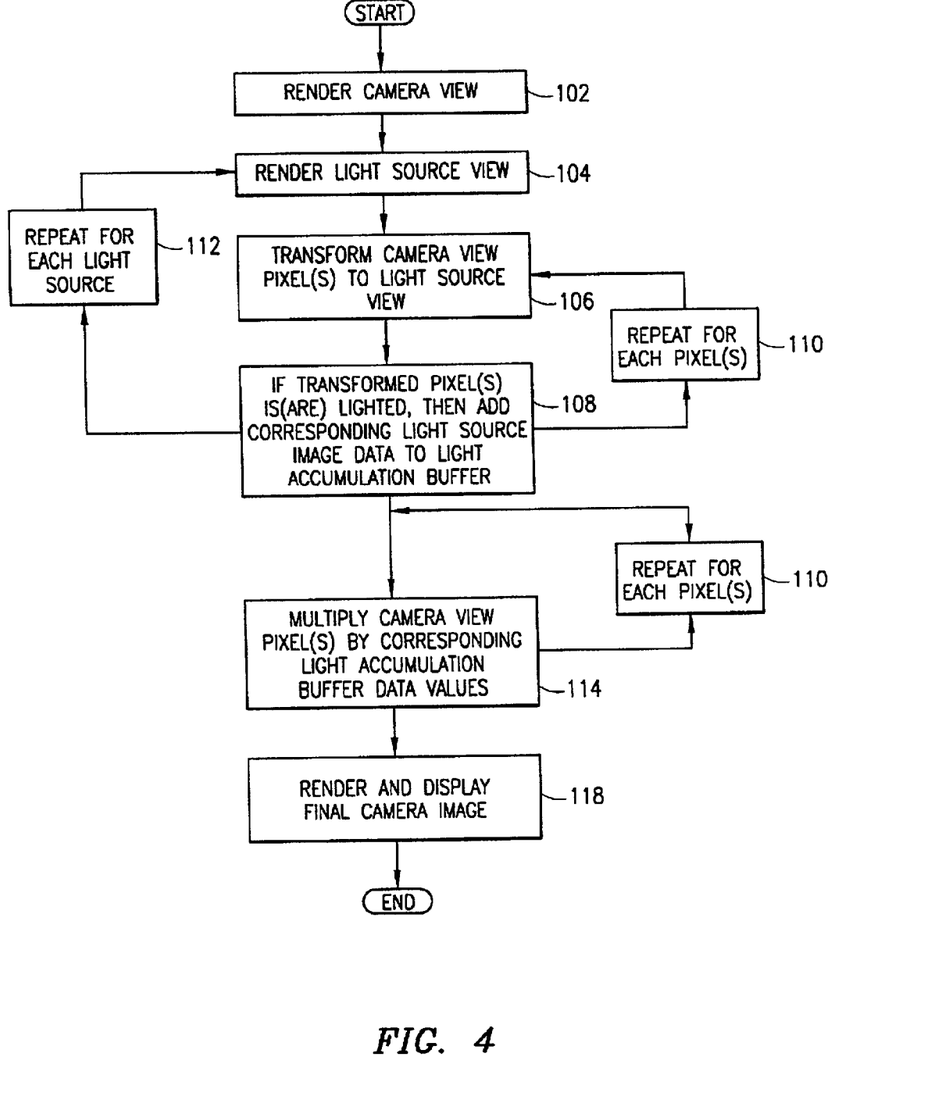
FIG. 4 is an exemplary flow-chart depicting an improved shadow rendering process, for use in a computer system, for example, as in FIG. 1, in accordance with certain embodiments of the present invention.

Reference is now made to FIG. 4, which depicts an exemplary flow-chart for an improved shadow rendering process 100, in accordance with certain embodiments of the present invention. Process 100 can be implemented, for example, in computer system 40 to render lighting and shadows for scene 10. In step 102, the camera's view is rendered using conventional methods, thereby producing camera image 51A and camera depth 51B. In step 104, the view from a light source is rendered. For example, in step 104, rendering the view from light source #1 produces light #1 image 51C and light #1 depth 51D.

Next, in step 106, a pixel 60 in camera image 51A is transformed or is otherwise used to determine a corresponding pixel 60' in light #1 image 51C (and light #1 depth 51D). The transformation calculations needed to move between coordinates in step 106 can be precalculated and stored, for example, in transformation table #1 provided that camera 14 and light source #1 are fixed with respect to scene 10. Alternatively, such transformation calculations can be conducted on-the-fly provided adequate processing capability. If either camera 14 or light source #1 are not fixed with respect to scene 10, then the transformation calculations can be conducted on-the-fly (i.e., in real-time between frames).

In step 108, if the transformed pixel identified in step 106 is illuminated by the light source, then the corresponding pixel data value in the light image is added to the light accumulation buffer 51G. For example, considering pixel 60', from the Z-value associated with pixel 60' (as identified in light #1 depth 51D) it can be determined if pixel 60' is lighted by, or shaded from, light source #1. If pixel 60' is lighted, then the corresponding (RGB) pixel data value from light #1 image 51C is added to light accumulation buffer 51G. If pixel 60' is not-lighted (i.e., is shaded), then no change is made to light accumulation buffer 51G.

Steps 106 and 108 are repeated for each of the pixels in camera image 51A, as depicted by the iteration provided by step 110. After all of the pixels in camera image 51A have been processed in steps 106–110, then, according to step 112, the process is repeated for each additional light source. Step 112 leads back to step 104, wherein the next light source view is rendered. For example, steps 104–110 can be repeated again for light source #2 (or #N light sources). This iterative process allows for each of the pixel data values within light accumulation buffer 51G to be incrementally increased in a manner that matches the cumulative light cast by the multiple light sources on each pixel.

After each of the light sources has been processed in accord with steps 104 through 112, then in step 114, a pixel data value from camera image 51A is multiplied by a corresponding pixel data value from light accumulation buffer 51G and the results are stored in camera image 51A. Step 114 is repeated for each of the pixels in camera image 51A, as depicted by iterative step 116. Then, in step 118, a resulting camera image 51A is further rendered in accord with other processes, as needed, and eventually stored in frame buffer 50 and displayed as a frame of data.

Process 100, therefore, in accordance with certain aspects of the present invention, provides realistic lighting and shadow rendering while also being computationally efficient. Process 100 can be adapted for a plurality of light sources, either fixed or moving, and for changing camera views. By way of example, the following exemplary pseudocode can be implemented in either hardware of software to provide for process 100:

```
RENDER EACH VIEW (PARTIAL IF THE LIGHT IS STATIONARY)
CLEAR ACCUM BUFFER
FOR EACH LIGHT SOURCE . . .
   FOR EACH PIXEL IN CAMERA IMAGE SP_X, SP_Y . . .
      TRANSFORM EACH SP TO A LP {LIGHT PIXEL} USING
      EITHER:
         TRANSFORM LOOK-UP TABLE,
         OR
         MATRIX TRANSFORMATION CALCULATION
      IF LP_Z < LIGHT DEPTH (LP_X, LP_Y) THEN
         ACCUM (SP_X, SP_Y) += LIGHT IMAGE (LP_X, LP_Y)
FOR EACH PIXEL IN CAMERA IMAGE . . .
   CAMERA IMAGE (SP_X, SP_Y) *= ACCUM (SP_Y, SP_Y)
```

Figure 5:
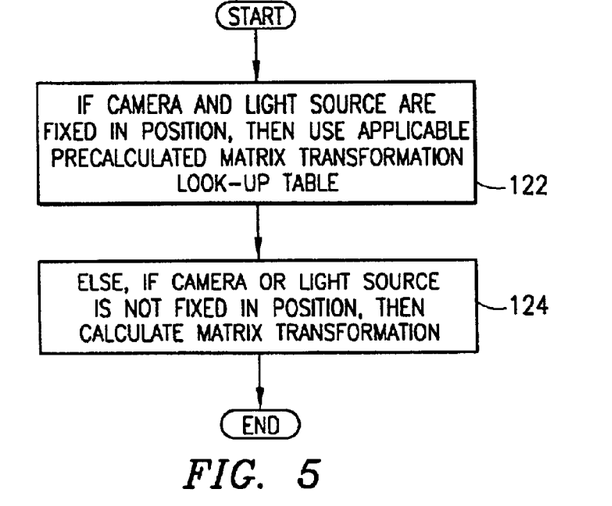
FIG. 5 is an exemplary flow-chart depicting further enhancements to the improved shadow rendering process in FIG. 4, in accordance with certain further embodiments of the present invention.

The flow-chart in FIG. 5 depicts an exemplary process 120 that can be included in step 106. Process 120 includes step 122, wherein an applicable transformation table is used to determine the transformation from camera to light source viewpoints when the camera and light source are fixed with respect to scene 10. Otherwise, in step 124, if the camera or light source are not fixed then a matrix transformation algorithm is used.

Figure 6:
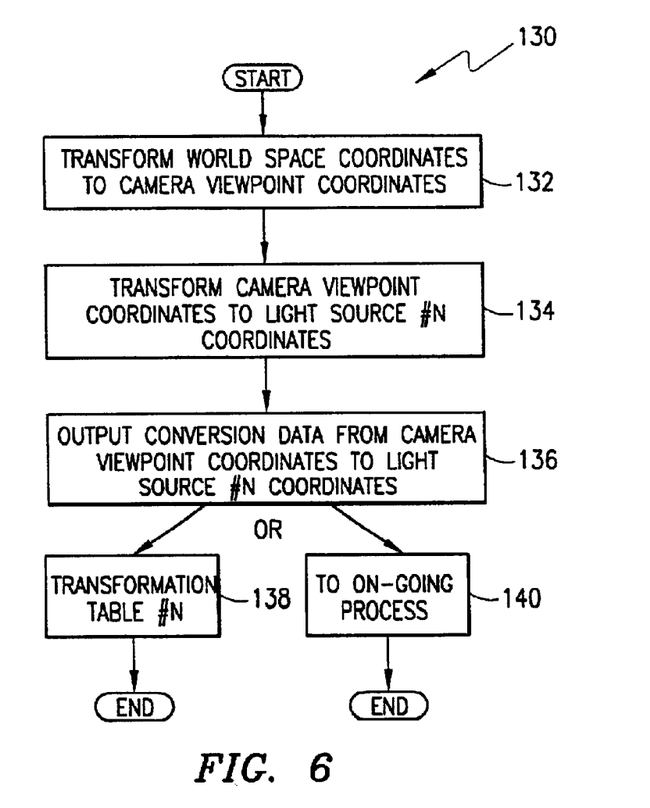
FIG. 6 is an exemplary flow-chart depicting further enhancements to the process in FIG. 5, in accordance with still further embodiments of the present invention.

An exemplary process 130 is depicted in the flow-chart of FIG. 6. Process 130 can be used to precalculate transform tables and/or included in step 124 calculate the transform on-the-fly. In step 132, a transformation is made from world space coordinate system 20 to camera coordinates. Next, in step 134, a transformation is made from camera coordinates to light source coordinates. These types of transformation processes, which are preferably completed using standard matrix algebra, are well known to those skilled in the art (see, e.g., Foley et al. text). In step 136, the resulting transformation data (camera to light source) is provided in a translation table per step 138, or returned to the shadow rendering process per step 140.

Figure 7A:
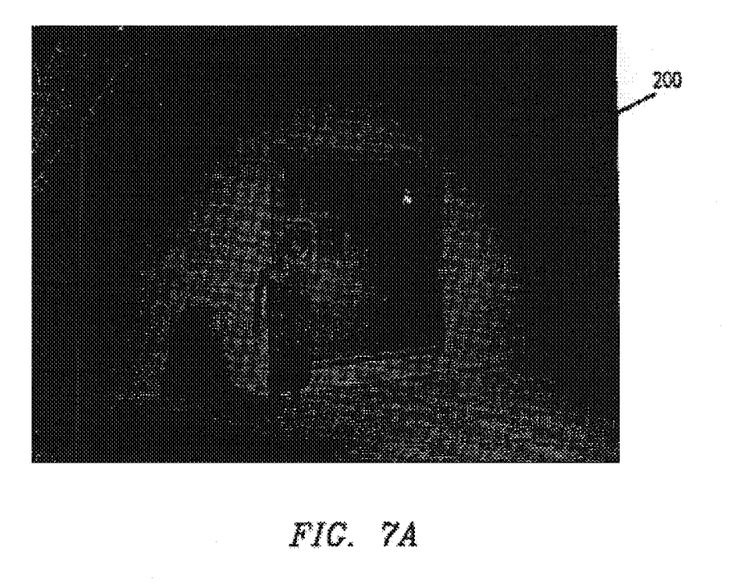
FIGS. 7A–D are photocopies of exemplary computer screen print-outs depicting an exemplary 3D scene and related rendered depth and image data from an interactive real time graphics rendering application, in accordance with certain embodiments of the present invention.
Figure 7B:
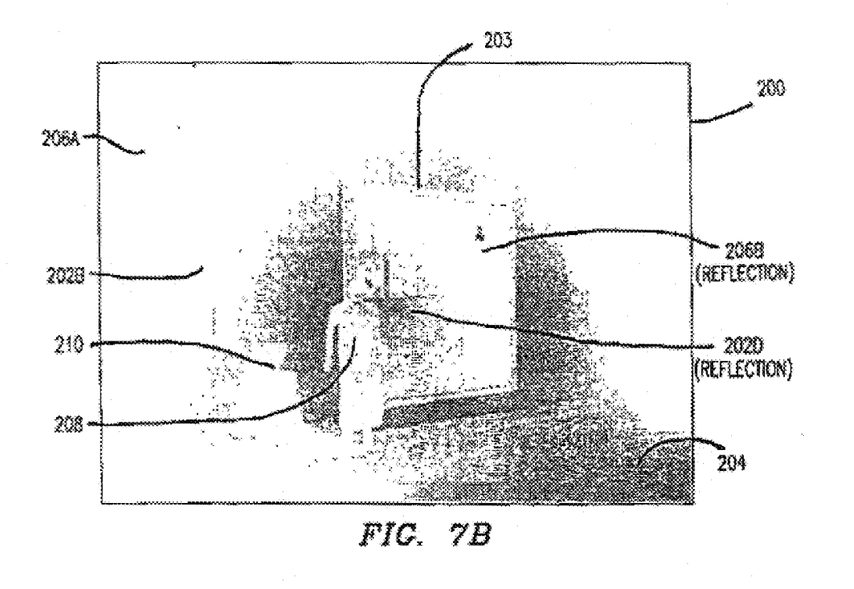
Figure 7C:
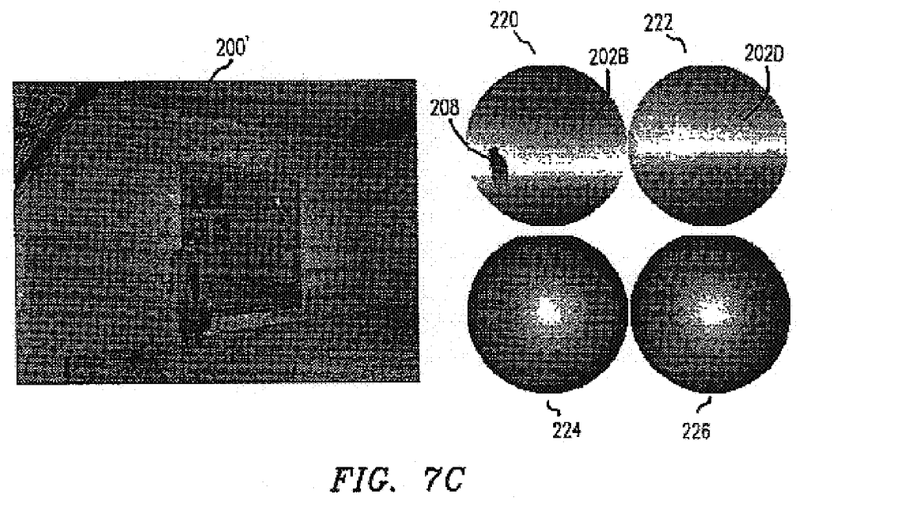
Figure 7D:
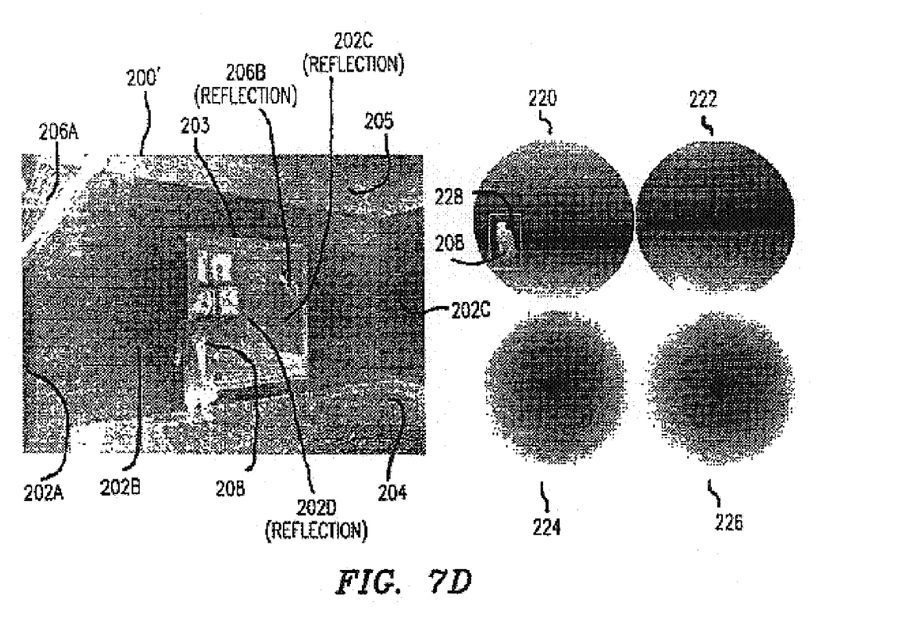

FIGS. 7A–D depict actual computer screen shots for an exemplary 3D scene of an interactive real time graphics rendering application, having an improved shadow rendering capability as described above and configured for a PC, in accordance with certain embodiments of the present invention. The application that generated the images depicted in FIGS. 7A–D is a computer-based interactive adventure game. In the exemplary scenes, the camera and two light sources are each fixed with respect to the scene. The frame in FIG. 7A is a monochrome photocopy of the colored rendered scene. The frame of FIG. 7A is shown inverted in FIG. 7B to further highlight the shadowing rendered in the scene. FIG. 7C is a essentially a "behind the scenes" view of various image buffers that are used to generate the image of FIG. 7A. FIG. 7D is the inverted image of FIG. 7C.

Reference will first be made to the image in FIG. 7A, with reference numerals being added to the inverted image of FIG. 7B and/or the fully lighted image of FIGS. 7C–D. In FIG. 7A there is depicted a portion of a room 200 having texture mapped walls 202A–D, floor 204, and ceiling 205. One of the walls 202B has a large mirror 203, in which is shown the reflection from another wall 202D having several pictures hanging thereon. Additional 3D objects within the room include torches 206A and 206B mounted on side walls, 202A and 202C, respectively. A man 208 is shown standing on floor 204 and in front of the mirrored wall 202B. Light is being reflected onto a portion of the mirrored wall 202B, the floor 204, the man 208, and on the wall 202D having pictures hanging thereon. The man 208 casts a shadow 210 onto a portion of the floor 204 and the mirrored wall 202B.

The frame in FIG. 7A, and in particular, the lighting rendered in the scene is demonstrated by the additional images in FIG. 7C. Room 200' is depicted in full light in FIG. 7C. From this image of room 200', one can understand the configuration of the modeled 3D world. Refer to the inverted image of FIG. 7D, as required, to identify a specific reference. FIG. 7C also includes four other images that are used to render the lighting and shadows in room 200'.

There are two light sources that are not visible within room 200'. These light sources are used to simulate the light emitted by simulated torches 206A and 206B. These light sources, which are not shown in FIG. 7C, are directional light sources having fixed positions with respect to room 200. Image 220 represents the light depth data for the first light, which has a circular field of view (or aperture) and is positioned to shine light on a portion of floor 204 and mirrored wall 202B. The information depicted in image 220 corresponds to depth, for example, as stored in a Z-buffer associated with this particular light source. Within depth image 220, as depicted in FIG. 7C, the closer a pixel is to the light source, the darker its image. Thus, for example, the man 208 in FIG. 7C is closest to the light source and as such is rendered the darkest shade. Conversely, the interface (corner) of mirrored wall 202B and floor 204 is the farthest away from the light source and as such is rendered the lightest shade. This is just one convention, obviously the convention could be reversed in other systems. Note, that the image 220 in FIG. 7D is inverted and thus so to is the convention.

Also associated with the first light source is a light image 224. In this example, light image 224 includes a graduated pattern of intensity that is highest near the center and lowest near the edges. In this example, light image 224 is essentially a light filter based on a cosine function. It is intended, however, that the RGB pixel data values in a light image can include any pattern of RGB data, including static and dynamically changing patterns. For example, in accordance with certain embodiments of the present invention, a light image can include a dynamically changing graphical image. This can be used to simulate light that is reflected from changing surfaces, such as, for example, the light reflected from a rippling body of water. By dynamically changing the light image using a recorded or simulated image of such a body of water, the light source will essentially paint the scene with a rippling light. Taken a further step, the light image can include an animation, motion picture or similar video image that is projected, not unlike a movie projector, on to the various surfaces of the scene. Indeed, this can be used to model a movie projector, wherein 3D objects, such as man 208 can walk in front of the projected light image and have portions of the projected image fall on his body.

With regard to man 208 as depicted in depth image 220, the depth image 220 has been further processed in this example to include data relating to the depth of man 208. This can be accomplished, for example, by comparing previous frames and completing new transform calculations for pixels that have changed and that are in the depth image for the light source. Thus, for example, from the previous frame, man 208 may have moved slightly (e.g., in response to inputs from the user). A portion of the pixels are identified as having changed from the previous frame. The portion of the pixels that changed are then transformed and processed to generate new modified light depth data 228. In this manner, only those portions of the scene that change need to be reprocessed.

For the second light source, a depth image 222 and light image 226 are also provided. Depth image 222 demonstrates that the second light source is positioned facing wall 202D and casting light on a portion of floor 204 and wall 202D. Light image 226 is similar to light image 224. Note that depth image 222 does not include man 208 or any other moving 3D object at this time. Thus, depth image 222 need not be updated at this time.

The various images in FIG. 7C are processed in accordance with process 100. A light accumulation buffer and subsequent frame buffer are created by combining data from the image of room 200', and light images 224 and 226, in accordance with the data in depth images 220 and 222. The resulting frame buffer is that of FIG. 7A, which clearly shows that man 208 casts a single shadow 210 as a result of the first light. Additionally, the accumulated light on mirrored wall 202B and 202D are shown.

In accordance with still further embodiments of the present invention, if camera 14 is required to periodically change position with respect to scene 10, for example, during an interactive simulation, then process 120 is repeated as necessary to recalculate and update the applicable transform tables, or to generate different, additional transform tables, based on the new camera position. If the camera is continually moving with respect to scene 10, then rather than manipulating and accumulating light based on pixels, process 100 is adapted to manipulate groups of pixels and/or polygons. This allows for a more granular approach, in which a light image can be rendered for each polygon, and light accumulation buffers can be used to accumulate light intensities from the various light sources for each polygon, rather than for each screen pixel. As such, a plurality of light images can be precomputed, one for each of the polygons (or for groups of polygons), for each of the fixed lights.

Although several preferred embodiments of the methods and arrangements of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A shadow rendering method, the method comprising the steps of:

providing observer data of a simulated multi-dimensional scene;

providing lighting data associated with a plurality of simulated light sources arranged to illuminate said scene, said lighting data including light image data;

for each of said plurality of light sources, comparing at least a portion of said observer data with at least a portion of said lighting data to determine if a modeled point within said scene is illuminated by said light source and storing at least a portion of said light image data associated with said point and said light source in a light accumulation buffer; and then combining at least a portion of said light accumulation buffer with said observer data; and outputting resulting image data.

2. The method as recited in claim 1, wherein said observer data includes observed color data and observed depth data associated with a plurality of modeled polygons within said scene as rendered from an observer's perspective.

3. The method as recited in claim 1, wherein said plurality of modeled polygons within said scene are associated with at least one pixel, such that said observed color data includes an observed red-green-blue value for said pixel and said observed depth data includes an observed z-buffer value for said pixel.

4. The method as recited in claim 1, wherein said lighting data includes source color data associated with at least one of said light sources and source depth data associated with said plurality of modeled polygons within said scene as rendered from a plurality of different light source's perspectives.

5. The method as recited in claim 4, wherein said plurality of modeled polygons within said scene are associated with at least one pixel, such that said source color data includes a source red-green-blue value for said pixel and said source depth data includes a source z-buffer value for said pixel.

6. The method as recited in claim 4, wherein the step of comparing at least a portion of said observer data with at least a portion of said lighting data to determine if a modeled point within said scene is illuminated by said light source further includes comparing at least a portion of said observed depth data with at least a portion of said source depth data to determine if said modeled point is illuminated by said light source.

7. The method as recited in claim 6, wherein the step of comparing at least a portion of said observed depth data with at least a portion of said source depth data to determine if said modeled point is illuminated by said light source further includes converting at least a portion of said observed depth data from said observer's perspective to at least one of said plurality of different light source's perspectives, before comparing said observed depth data with said source depth data.

8. The method as recited in claim 7, wherein the step of converting at least a portion of said observed depth data from said observer's perspective to at least one of said plurality of different light source's perspectives further includes using a precalculated matrix transformation look-up table for at least one of said plurality of light sources, when said light source has a fixed perspective of said scene.

9. The method as recited in claim 1, wherein at least a portion of said source color data is selectively controlled source color data that can be changed over a period of time during which at least the step of outputting the resulting image data is repeated a plurality of times.

10. The method as recited in claim 9, wherein said controlled source color data includes data selected from a set comprising motion picture data, video data, animation data, and computer graphics data.

11. An arrangement configured to render shadows in a simulated multi-dimensional scene, the arrangement comprising:
an output to a display screen configured to display image data;
memory for storing data including observer data associated with a simulated multi-dimensional scene, and lighting data associated with a plurality of simulated light sources arranged to illuminate said scene, said lighting data including light image data, said memory further including a light accumulation buffer portion and a frame buffer portion;
at least one processor coupled to said memory and said output and operatively configured to, for each of said plurality of light sources, compare at least a portion of said observer data with at least a portion of said lighting data to determine if a modeled point within said scene is illuminated by said light source and storing at least a portion of said light image data associated with said point and said light source in said light accumulation buffer, then combining at least a portion of said light accumulation buffer with said observer data, and storing resulting image data in said frame buffer, and outputting at least a portion of said image data in said frame buffer via said output.

12. The arrangement as recited in claim 11, wherein said observer data includes observed color data and observed depth data associated with a plurality of modeled polygons within said scene as rendered from an observer's perspective.

13. The arrangement as recited in claim 12, wherein said plurality of modeled polygons within said scene are associated with at least one pixel on said display screen, such that said observed color data includes an observed red-green-blue value for said pixel and said observed depth data includes a observed z-buffer value for said pixel.

14. The arrangement as recited in claim 12, wherein said lighting data includes source color data associated with at least one of said light sources and source depth data associated with said plurality of modeled polygons within said scene as rendered from a plurality of different light source's perspectives.

15. The arrangement as recited in claim 14, wherein said plurality of modeled polygons within said scene are associated with at least one pixel, such that said source color data includes a source red-green-blue value for said pixel and said source depth data includes a source z-buffer value for said pixel.

16. The arrangement as recited in claim 14, wherein said processor is further configured to compare at least a portion of said observed depth data with at least a portion of said source depth data to determine if said modeled point is illuminated by said light source.

17. The arrangement as recited in claim 16, wherein said processor is further configured to convert at least a portion of said observed depth data from said observer's perspective to at least one of said plurality of different light source's perspectives, before comparing said observed depth data with said source depth data.

18. The arrangement as recited in claim 17, wherein said memory further includes at least one precalculated matrix transformation table associated with at least one of said plurality of light sources, and said processor is further configured to use said precalculated matrix transformation look-up table when said light source is simulated as having a fixed perspective of said scene.

19. The arrangement as recited in claim 14, wherein said processor is further configured to selectively control at least a portion of said source color data over a period of time.

20. The arrangement as recited in claim 19, wherein said controlled source color data includes data selected from a set comprising motion picture data, video data, animation data, and computer graphics data.

21. A computer-readable medium carrying at least one set of computer instructions configured to cause a computer to operatively simulate light falling on a modeled object in a computer generated multi-dimensional graphics simulation by performing operations comprising:
a) rendering an observer view of at least a portion of a spatially modeled object as a plurality of observed depth values and observed image values;
b) rendering a source view of at least a portion of said modeled object as a plurality of source depth values and a plurality of source image values;
c) transforming at least a portion of said observed depth values to said source view;
d) modifying at least one image accumulation value with one of said observed image values if said corresponding transformed observer value is equal to a comparable one of said source depth values;
e) multiplying said one of said observed image values by said at least one image accumulation value to produce at least one pixel value; and
f) output said pixel value to a computer screen.

22. The computer-readable medium as recited in claim 21, further configured to cause tcomputer to perform the further step of:
g) following step d), repeating steps b) through d) for at least one additional source view.

23. The computer-readable medium as recited in claim 22, further configured to cause the computer to perform the further steps of:
h) repeating steps a) through g) a frame rate; and
wherein step f) further includes sequentially outputting a plurality of pixels as frames of data to said computer screen at said frame rate, and said step of rendering said source view further includes changing at least one of said source image values between said subsequent frames of data.

24. The computer-readable medium as recited in claim 23 wherein at least a portion of said source image values represent color data selected from a set comprising motion picture data, video data, animation data, and computer graphics data.

25. The computer-readable medium as recited in claim 23, wherein step c) further includes transforming at least a portion of said observed depth values from an observer coordinate system to a corresponding source coordinate system.

26. The computer-readable medium as recited in claim 25, wherein the step of transforming at least a portion of said observed depth values from an observer coordinate system to a corresponding source coordinate system further includes using a precalculated transformation table to transform directly from said observer coordinate system to said corresponding source coordinate system.

27. A computer-readable medium carrying at least one set of computer instructions configured to cause at least one processor to operatively render simulated shadows in a multi-dimensional simulated scene by performing the steps of:

providing observer data of a simulated multi-dimensional scene;

providing lighting data associated with a plurality of simulated light sources arranged to illuminate said scene, said lighting data including light image data;

for each of said plurality of light sources, comparing at least a portion of said observer data with at least a portion of said lighting data to determine if a modeled point within said scene is illuminated by said light source and storing at least a portion of said light image data associated with said point and said light source in a light accumulation buffer; and then combining at least a portion of said light accumulation buffer with said observer data; and outputting resulting image data.

28. The computer-readable medium as recited in claim 27, wherein said observer data includes observed color data and observed depth data associated with a plurality of modeled polygons within said scene as rendered from an observer's perspective.

29. The computer-readable medium as recited in claim 28, wherein said plurality of modeled polygons within said scene are associated with at least one pixel, such that said observed color data includes an observed red-green-blue value for said pixel and said observed depth data includes a observed z-buffer value for said pixel.

30. The computer-readable medium as recited in claim 28, wherein said lighting data includes source color data associated with at least one of said light sources and source depth data associated with said plurality of modeled polygons within said scene as rendered from a plurality of different light source's perspectives.

31. The computer-readable medium as recited in claim 28, wherein said plurality of modeled polygons within said scene are associated with at least one pixel, such that said source color data includes a source red-green-blue value for said pixel and said source depth data includes a source z-buffer value for said pixel.

32. The computer-readable medium as recited in claim 30, wherein the step of comparing at least a portion of said observer data with at least a portion of said lighting data to determine if a modeled point within said scene is illuminated by said light source further includes comparing at least a portion of said observed depth data with at least a portion of said source depth data to determine if said modeled point is illuminated by said light source.

33. The computer-readable medium as recited in claim 32, wherein the step of comparing at least a portion of said observed depth data with at least a portion of said source depth data to determine if said modeled point is illuminated by said light source further includes converting at least a portion of said observed depth data from said observer's perspective to at least one of said plurality of different light source's perspectives, before comparing said observed depth data with said source depth data.

34. The computer-readable medium as recited in claim 33, wherein the step of converting at least a portion of said observed depth data from said observer's perspective to at least one of said plurality of different light source's perspectives further includes using a precalculated matrix transformation look-up table for at least one of said plurality of light sources, when said light source has a fixed perspective of said scene.

35. The computer-readable medium as recited in claim 30, wherein at least a portion of said source color data is selectively controlled source color data that can be changed over a period of time during which at least the step of outputting the resulting image data to a display device is repeated a plurality of times.

36. The computer-readable medium as recited in claim 35, wherein said controlled source color data includes data selected from a set comprising motion picture data, video data, animation data, and computer graphics data.

37. A computer circuit for processing computer graphics data coupled to at least one processor to operatively render simulated shadows in a multi-dimensional simulated scene by performing steps comprising:

a) receiving observer data of a simulated multi-dimensional scene;

b) receiving lighting data associated with a plurality of simulated light sources arranged to illuminate said scene, said lighting data including light image data;

c) for each of said plurality of light sources, comparing at least a portion of said observer data with at least a portion of said lighting data to determine if a modeled point within said scene is illuminated by said light source and storing at least a portion of said light image data associated with said point and said light source;

d) combining at least a portion of said stored light image data with said observer data; and e) transmitting resulting image data to be displayed on a computer screen.

38. The computer circuit recited in claim 37, wherein said observer data includes observed color data and observed depth data associated with a plurality of modeled polygons within said scene as rendered from an observer's perspective.

39. The computer circuit recited in claim 38, wherein said plurality of modeled polygons within said scene are associated with at least one pixel, such that said observed color data includes an observed red-green-blue value for said pixel and said observed depth data includes an observed z-buffer value for said pixel.

40. The computer circuit recited in claim 38, wherein said lighting data includes source color data associated with at least one of said light sources and source depth data associated with said plurality of modeled polygons within said scene as rendered from a plurality of different light source's perspectives.

41. The computer circuit recited in claim 38, wherein said plurality of modeled polygons within said scene are associated with at least one pixel on said computer screen, such that said source color data includes a source red-green-blue value for said pixel and said source depth data includes a source z-buffer value for said pixel.

42. The computer circuit recited in claim 40, where in the step of comparing at least a portion of said observer data with at least a portion of said lighting data to determine if a modeled point within said scene is illuminated by said light source further includes comparing at least a portion of said observed depth data with at least a portion of said source depth data to determine if said modeled point is illuminated by said light source.

43. The computer circuit recited in claim 42, where in the step of comparing at least a portion of said observed depth data with at least a portion of said source depth data to determine if said modeled point is illuminated by said light source further includes converting at least a portion of said observed depth data from said observer's perspective to at least one of said plurality of different light source's perspectives, before comparing said observed depth data with said source depth data.

44. The computer circuit recited in claim 43, wherein the step of converting at least a portion of said observed dept data from said observer's perspective to at least one of said plurality of different light source's perspectives further includes using a look-up table containing predetermined transformation values for at least one of said plurality of light sources, when said light source has a fixed perspective of said scene.

45. The computer circuit recited in claim 40, wherein at least a portion of said source color data is selectively controlled source color data that can be changed over a period of time during which at least the step of transmitting the resulting image data to said computer screen is repeated a plurality of times.

46. The computer circuit recited in claim 45, wherein said controlled source color data includes data selected from stored motion picture data.

47. The computer circuit recited in claim 45, wherein said controlled source color data includes data selected from stored computer animation data.

48. The computer circuit recited in claim 45, wherein said controlled source color data includes data selected from stored video data.

49. The computer circuit recited in claim 45, wherein said controlled source color data includes data selected from stored computer graphics sequence data.

50. A computer circuit for processing computer graphics data coupled to a computer system to operatively render simulated shadows in a multi-dimensional simulated scene by performing steps comprising:
  a) receiving observer data of a simulated multi-dimensional scene;
  b) receiving lighting data associated with a plurality of simulated light sources arranged to illuminate said scene, said lighting data including light image data;
  c) for each of said plurality of light sources, comparing at least a portion of said observer data with at least a portion of said lighting data to determine if a modeled point within said scene is illuminated by said light source and storing at least a portion of said light image data associated with said point and said light source;
  d) combining at least a portion of said light image data with said observer data; and
  e) transmitting resulting image data for display on a computer screen.

51. The computer circuit recited in claim 50, wherein said observer data includes observed color data and observed depth data associated with a plurality of modeled polygons within said scene as rendered from an observer's perspective.

52. The computer circuit recited in claim 51, wherein said plurality of modeled polygons within said scene are associated with at least one pixel, such that said observed color data includes an observed red-green-blue value for said pixel and said observed depth data includes an observed z-buffer value for said pixel.

53. The computer circuit recited in claim 51, wherein said lighting data includes source color data associated with at least one of said light sources and source depth data associated with said plurality of modeled polygons within said scene as rendered from a plurality of different light source's perspectives.

54. The computer circuit recited in claim 51, wherein said plurality of modeled polygons within said scene are associated with at least one pixel on said computer screen, such that said source color data includes a source red-green-blue value for said pixel and said source depth data includes a source z-buffer value for said pixel.

55. The computer circuit recited in claim 53, where in the step of comparing at least a portion of said observer data with at least a portion of said lighting data to determine if a modeled point within said scene is illuminated by said light source further includes comparing at least a portion of said observed depth data with at least a portion of said source depth data to determine if said modeled point is illuminated by said light source.

56. The computer circuit recited in claim 55, where in the step of comparing at least a portion of said observed depth data with at least a portion of said source depth data to determine if said modeled point is illuminated by said light source further includes converting at least a portion of said observed depth data from said observer's perspective to at least one of said plurality of different light source's perspectives, before comparing said observed depth data with said source depth data.

57. The computer circuit recited in claim 56, wherein the step of converting at least a portion of said observed depth data from said observer's perspective to at least one of said plurality of different light source's perspectives further includes using a look-up table containing predetermined transformation values for at least one of said plurality of light sources, when said light source has a fixed perspective of said scene.

58. The computer circuit recited in claim 53, wherein at least a portion of said source color data is selectively controlled source color data that can be changed over a period of time during which at least the step of transmitting the resulting image data to said computer screen is repeated a plurality of times.

59. The computer circuit recited in claim 58, wherein said controlled source color data includes data selected from stored motion picture data.

60. The computer circuit recited in claim 58, wherein said controlled source color data includes data selected from stored computer animation data.

61. The computer circuit recited in claim 58, wherein said controlled source color data includes data selected from stored video data.

62. The computer circuit recited in claim 58, wherein said controlled source color data includes data selected from stored computer graphics sequence data.

* * * * *